United States Patent
Kurihara et al.

(10) Patent No.: US 11,100,705 B2
(45) Date of Patent: Aug. 24, 2021

(54) GEOGRAPHIC INFORMATION PROCESSING DEVICE, GEOGRAPHIC INFORMATION PROCESSING METHOD, AND PROGRAM

(71) Applicant: Komatsu Ltd., Tokyo (JP)

(72) Inventors: Masahiro Kurihara, Tokyo (JP); Mitsuhiro Aoki, Tokyo (JP)

(73) Assignee: Komatsu LTD, Tokyo (JP)

( * ) Notice: Subject to any disclaimer, the term of this patent is extended or adjusted under 35 U.S.C. 154(b) by 0 days.

(21) Appl. No.: 16/464,449

(22) PCT Filed: Dec. 22, 2017

(86) PCT No.: PCT/JP2017/046121
§ 371 (c)(1),
(2) Date: May 28, 2019

(87) PCT Pub. No.: WO2018/159079
PCT Pub. Date: Sep. 7, 2018

(65) Prior Publication Data
US 2019/0304174 A1    Oct. 3, 2019

(30) Foreign Application Priority Data

Feb. 28, 2017   (JP) .............................. JP2017-037458

(51) Int. Cl.
*G06T 17/05* (2011.01)
*G06T 15/00* (2011.01)
*G01C 11/06* (2006.01)

(52) U.S. Cl.
CPC .............. *G06T 17/05* (2013.01); *G01C 11/06* (2013.01); *G06T 15/005* (2013.01);
(Continued)

(58) Field of Classification Search
CPC ... G06T 17/05; G06T 15/005; G06T 2215/06; G06T 2215/12; G01C 11/06; Y02A 90/32
(Continued)

(56) References Cited

U.S. PATENT DOCUMENTS

| 2009/0273601 A1* | 11/2009 | Kim ........................ G06T 17/05 345/419 |
| 2016/0063754 A1* | 3/2016 | Korchev .................. G06T 15/08 345/424 |

(Continued)

FOREIGN PATENT DOCUMENTS

| JP | 11-191111 A | 7/1999 |
| JP | 2011-086170 A | 4/2011 |
| JP | 2014-137230 A | 7/2014 |

OTHER PUBLICATIONS

Reinbacher, I., "Geometric Algorithms for Delineating Geographic Regions", PhD Thesis, Utrecht University, Netherlands, published 2006 <URL: <https://dspace.library.uu.nl/bitstream/handle/1874/9761/full.pdf>>, pp. 1-138 and Information Sheets.

(Continued)

Primary Examiner — Jin Ge
(74) Attorney, Agent, or Firm — Locke Lord LLP

(57) ABSTRACT

An acquisition unit acquires design data which is three-dimensional data indicating a terrain. A gradient identification unit identifies a gradient of each of the plurality of polygons configuring the design data. An attribute setting unit sets an attribute for each of the plurality of polygons based on the gradient.

12 Claims, 10 Drawing Sheets

(52) U.S. Cl.
CPC ...... *G06T 2215/06* (2013.01); *G06T 2215/12* (2013.01); *Y02A 90/30* (2018.01)

(58) Field of Classification Search
USPC ........................................................ 345/419
See application file for complete search history.

(56) References Cited

U.S. PATENT DOCUMENTS

| | | |
|---|---|---|
| 2016/0259046 A1* | 9/2016 | Carlbom ............... G01S 13/904 |
| 2017/0018115 A1* | 1/2017 | Blanchard ............... G06T 17/05 |
| 2017/0116780 A1* | 4/2017 | Han ........................ G06T 17/20 |
| 2017/0243404 A1* | 8/2017 | Morales .................... G06T 5/30 |
| 2019/0080520 A1* | 3/2019 | Godzaridis ............. G06T 19/20 |

OTHER PUBLICATIONS

Reinbacher, I., "Geometric Algorithms for Delineating Geographic Regions", PhD Thesis, Utrecht University, Netherlands, published 2006 <URL: <https://dspace.library.uu.nl/bltstream/handle/1874/9761/full.pdf>>, pp. 1-138 and Information Sheets.

Taylor, D. C. et al., "An algorithm for continuous resolution polygonalizations of a discrete surface",Graphics Interface 1994, published May 18, 1994, pp. 33-42 <URL:https://pdfs.semanticscholar.org/4a34/0640dc1257718de48b6599e49211e35a1691.pdf>.

* cited by examiner

GEOGRAPHIC INFORMATION PROCESSING DEVICE, GEOGRAPHIC INFORMATION PROCESSING METHOD, AND PROGRAM

TECHNICAL FIELD

The present invention relates to a geographic information processing device, a geographic information processing method, and a program.

Priority is claimed on Japanese Patent Application No. 2017-037458, filed on Feb. 28, 2017, the content of which is incorporated herein by reference.

BACKGROUND ART

A technique of allocating a terrain type for each polygon (mesh) configuring a three-dimensional image indicating a terrain and performing calculation based on the terrain type is known as disclosed in PTL 1.

CITATION LIST

Patent Literature

[PTL 1] Japanese Unexamined Patent Application, First Publication No. 2011-086170

SUMMARY OF INVENTION

Technical Problem

A method in which a user selects each of polygons configuring a given three-dimensional image one by one and inputs an attribute of the selected polygon can be given as an example of a method of assigning an attribute such as a terrain type to a three-dimensional image. In addition, also a technique of selecting a plurality of polygons at once by designating a range at the time of polygon selection is known. However, selecting each polygon and inputting an attribute to each polygon is a significant burden to the user. In addition, in a case where the size of a polygon is extremely small, an omission of selection of the polygon occurs in some cases.

An object of an aspect of the present invention is to provide a geographic information processing device, a geographic information processing method, and a program that can appropriately set an attribute of each polygon.

Solution to Problem

According to an aspect of the present invention, a geographic information processing device includes an acquisition unit that is configured to acquire design data which is three-dimensional data indicating a terrain, a gradient identification unit that is configured to identify a gradient of each of the plurality of polygons configuring the design data, and an attribute setting unit that is configured to set an attribute for each of the plurality of polygons based on the gradient.

Advantageous Effects of Invention

According to the above aspect, the geographic information processing device can appropriately set an attribute for each of the polygons configuring the design data.

DESCRIPTION OF EMBODIMENTS

First Embodiment (Configuration of Terrain Check System 1)

Figure 1:
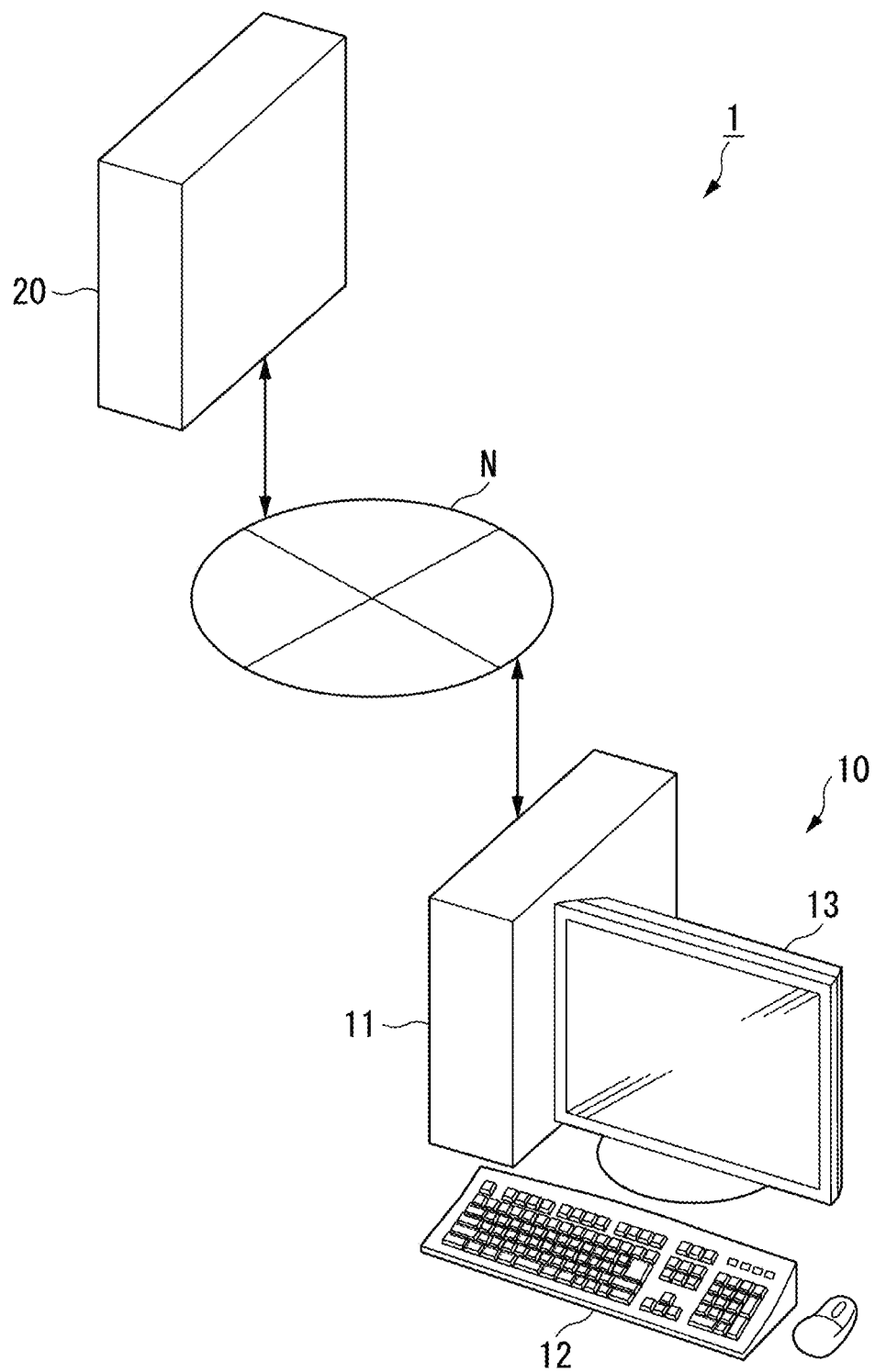
FIG. 1 is a configuration view illustrating a configuration of a terrain check system according to a first embodiment.

FIG. 1 is a configuration view illustrating a configuration of a terrain check system according to a first embodiment.

A terrain check system 1 according to the first embodiment includes a client terminal 10 and a terrain check server 20. The client terminal 10 and the terrain check server 20 are connected to each other via a network N. The terrain check server 20 is an example of a geographic information processing device. The client terminal 10 transmits design data of a construction site and survey data obtained by a survey of the construction site to the terrain check server 20. Examples of the survey of the construction site include an aerial photo survey by a drone (unmanned aerial vehicle), a survey by a surveying airplane, as-built (current terrain) measurement by a construction machine, current terrain measurement based on an image captured by a stereo camera included in the construction machine, and the like. Examples of the client terminal 10 include a personal computer (PC), a surveying instrument, a drone, a controller provided in a construction machine, a stereo camera device, and the like.

The terrain check server 20 determines whether or not construction is carried out as design data by a constructor. Design data and survey data are three-dimensional data, both of which are configured with a plurality of polygons. Survey data and design data do not necessarily have to match each other completely. The terrain check server determines that construction is carried out as design data by a constructor insofar as an error falls within a certain allowable range. An allowable range of an error is different according to a terrain type.

An example of design data includes data in the LandXML format. Data in the LandXML format represents a terrain through a triangulated irregular network (TIN). That is, design data according to the first embodiment is configured with a plurality of triangles, and an X-coordinate value, a Y-coordinate value, and a Z-coordinate value are stored in vertices of each triangle. In the other embodiment, design data may be represented by a polygon other than a triangle.

(Configuration of Client Terminal 10)

Figure 2:
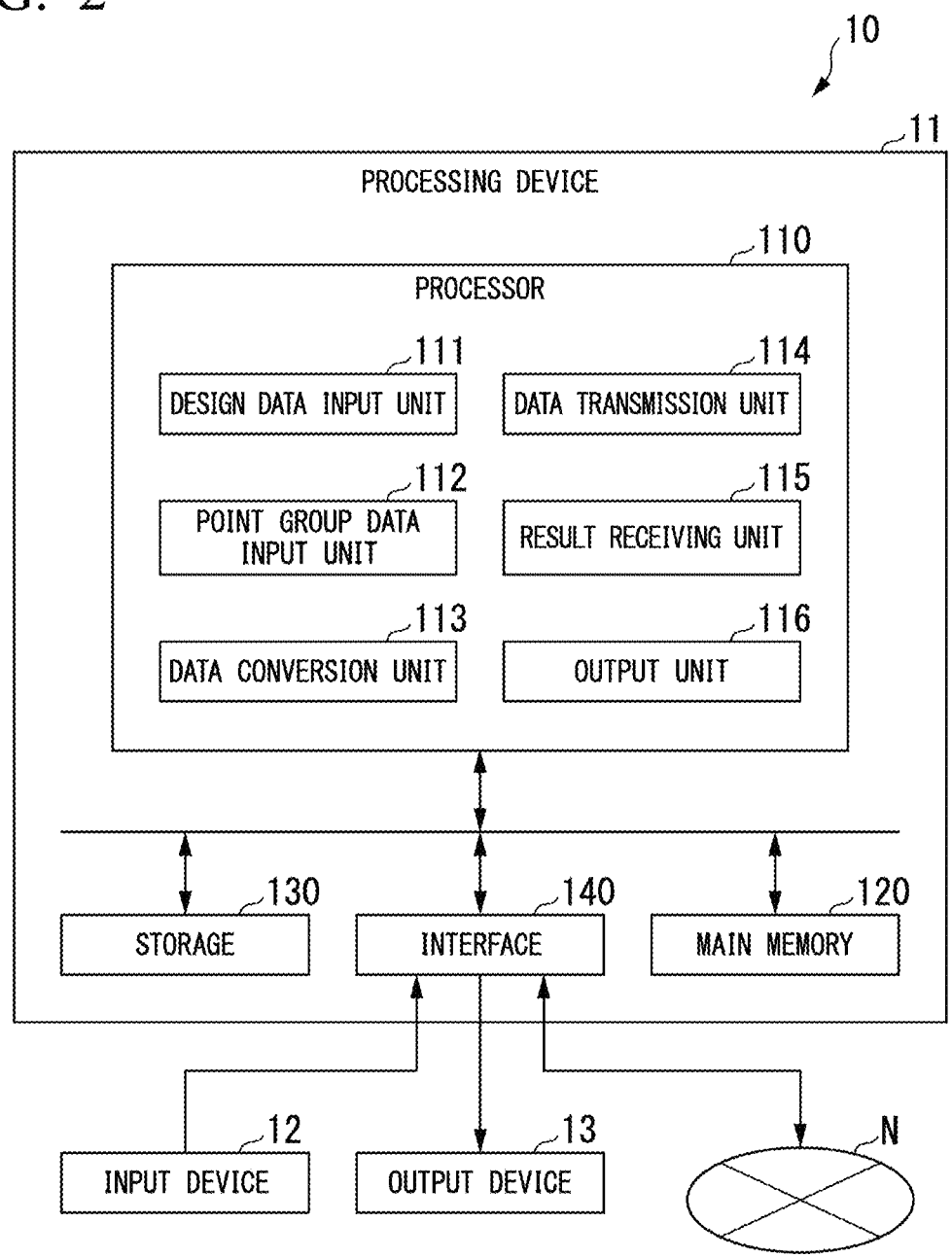
FIG. 2 is a block diagram showing a configuration of a client terminal according to the first embodiment.

FIG. 2 is a block diagram showing a configuration of the client terminal according to the first embodiment.

The client terminal 10 includes a processing device 11 including: a processor 110, a main memory 120, a storage 130, and an interface 140; an input device 12; and an output device 13. The storage 130 stores a terrain check client program. The processor 110 reads the terrain check client program from the storage 130 to deploy to the main memory 120, and executes processing in accordance with the terrain check client program. The processing device 11 is connected to the network N via the interface 140. In addition, the processing device 11 is connected to the input device 12 and the output device 13 via the interface 140.

Examples of the storage 130 include a hard disk drive (HDD), a solid state drive (SSD), a magnetic disk, a magneto-optical disk, a compact disc read only memory (CD-ROM), a digital versatile disc read only memory (DVD-ROM), a semiconductor memory, and the like. The storage 130 may be an internal medium directly connected to a bus of the client terminal 10, or may be an external medium connected to the client terminal 10 via the interface 140. The storage 130 is a non-temporary tangible storage medium.

The input device 12 is a device through which operation of a user is input into the processing device 11. For example, a keyboard, a mouse, a touch panel, and the like can be used as the input device 12.

The output device 13 is a device which outputs computing results of the processing device 11. For example, a display, a printer, a speaker, and the like can be used as the output device 13.

The processor 110 includes a design data input unit 111, a point group data input unit 112, a data conversion unit 113, a data transmission unit 114, a result receiving unit 115, and an output unit 116 by execution of the terrain check client program.

The design data input unit 111 receives an input of design data, which is TIN data indicating a finished terrain of the construction site. The design data input unit 111 acquires the design data from an external memory or an external server, which is connected to the interface 140. The design data input unit 111 may acquire the TIN data from a TIN data preparing unit (not illustrated) that converts CAD data to the TIN data. A reference figure, a reference surface, a reference line, or a reference point, for example, may be set as the design data. For example, in a case where a construction target is construction of filling up a road, design data includes a center line indicating a road center (road center line), which is an example of the reference line.

The point group data input unit 112 receives an input of point group data obtained through a terrain survey. The point group data input unit 112 acquires the point group data from, for example, the external memory, a drone main body, a controller in a construction machine, or a stereo camera device, which is connected to the interface 140 in a wired or wireless manner.

The data conversion unit 113 converts the point group data to mesh data. Mesh data is data in which various types of data including height data are stored in each mesh which is obtained by dividing a terrain so as to have a grid shape at a predetermined distance. The mesh data converted by the data conversion unit 113 refers to survey data. The data conversion unit 113 converts the point group data to have a grid shape and converts data to mesh data, for example, by setting an average value of height data of point group data existing in each mesh (grid) to a height of that mesh. In the other embodiment, survey data may be represented by a polygon instead of mesh data. In addition, the data conversion unit 113 checks presence or absence of missing, overlapping, and interference of generated survey data, and corrects or makes notification of the presence or absence of missing, overlapping, and interference. That is, the data conversion unit 113 is an example of an error detection unit.

The data transmission unit 114 transmits design data and survey data to the terrain check server 20.

The result receiving unit 115 receives comparison result data between design data and survey data from the terrain check server 20.

The output unit 116 outputs the comparison result data received by the result receiving unit 115 to the output device 13 connected via the interface 140.

<Configuration of Terrain Check Server 20>

Figure 3:
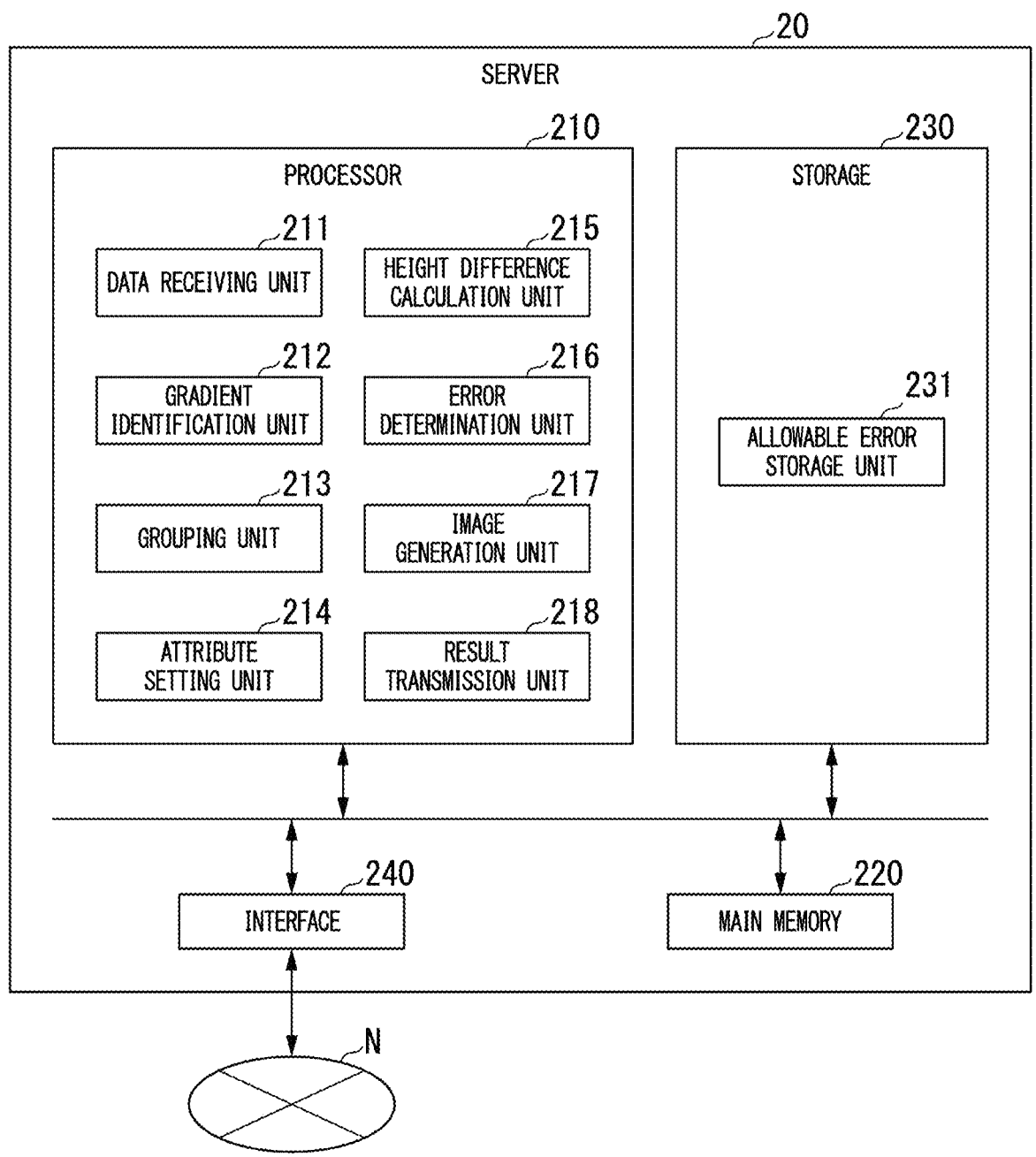
FIG. 3 is a block diagram showing a configuration of a terrain check server according to the first embodiment.

FIG. 3 is a block diagram showing a configuration of a terrain check server according to the first embodiment. The terrain check server 20 includes a processor 210, a main memory 220, a storage 230, and an interface 240. The storage 230 stores a terrain check server program. The processor 210 reads the terrain check server program from the storage 230 to deploy to the main memory 220, and executes processing in accordance with the terrain check server program. The terrain check server 20 is connected to the network N via the interface 240.

Examples of the storage 230 include an HDD, an SSD, a magnetic disk, a magneto-optical disk, a CD-ROM, a DVD-ROM, a semiconductor memory, and the like. The storage 230 may be an internal medium directly connected to a bus of the terrain check server 20, or may be an external medium connected to the terrain check server 20 via the interface 240. The storage 230 is a non-temporary tangible storage medium.

The processor 210 includes a data receiving unit 211, a gradient identification unit 212, a grouping unit 213, an attribute setting unit 214, a height difference calculation unit 215, an error determination unit 216, an image generation unit 217, and a result transmission unit 218 by execution of the terrain check server program. In addition, a storage area corresponding to an allowable error storage unit 231 is secured in the storage 230.

The data receiving unit 211 receives design data and survey data from the client terminal 10. The data receiving unit 211 is an example of an acquisition unit that acquires design data, and is an example of a comparison data acquisition unit that acquires survey data.

The gradient identification unit 212 identifies each gradient of a plurality of triangles configuring the received design data. The gradient identification unit 212 can identify a gradient, for example, by acquiring a normal vector of a triangle. That is, it can be seen that a gradient of a triangle decreases as an angle between a normal vector and a vertical line (a normal vector of a horizontal plane) decreases. A normal vector can be obtained by deriving two vectors from three vertices configuring a triangle and calculating a vector product thereof.

The grouping unit 213 classifies a plurality of triangles configuring design data into several groups based on a gradient of each triangle identified by the gradient identification unit 212. A group refers to a group formed of triangles (polygons) connected to each other. Specifically, the grouping unit 213 classifies a combination of consecutive triangles, the triangles each having a gradient included in a predetermined range, into the same group based on geometrical information (gradient information and adjacent information) of each triangle. Herein, the combination of consecutive triangles refers to a combination in which each of the triangles configuring the combination shares a common side with another triangle configuring the combination. For example, in a case where a first triangle and a second triangle share a first side and the second triangle and a third triangle share a second side, the first triangle, the second triangle, and the third triangle are consecutive.

Specifically, the grouping unit 213 classifies a plurality of triangles including a triangle having a part that is in contact with a center line included in design data, the plurality of consecutive triangles each having a gradient of a triangle that falls short of a crest upper threshold, into the same group. Hereinafter, this group will be referred to as a crest group. The crest upper threshold is an upper limit value of a gradient acquired at a crest. A lower limit value of a gradient acquired at the crest is 0 degree. The crest refers to a high surface of a construction target, which is formed through filling, and is, for example, a surface on which a road is to be formed in construction of filling up a road.

In addition, the grouping unit 213 classifies a combination of consecutive triangles each having a gradient of a triangle that is equal to or higher than a slope lower threshold as the same group and classifies each of combinations of consecutive triangles into groups. Hereinafter, these groups will be referred to as slope groups. The slope lower threshold is a lower limit value of a gradient acquired at a slope. An upper limit value of a gradient acquired at the slope is 90 degrees. The slope refers to an inclined surface of the construction target, which is formed through cutting or filling, and is, for example, an inclined surface which is provided on a lateral surface of a surface on which the road is to be formed in the construction of filling up a road.

In addition, the grouping unit 213 classifies a combination of consecutive triangles each having a gradient of a triangle that falls short of a flat ground upper threshold as the same group and classifies each of combinations of consecutive triangles into groups. Hereinafter, these groups will be referred to as flat ground groups. The flat ground upper threshold is an upper limit value of a gradient acquired at flat ground and a berm. A lower limit value of a gradient acquired at the flat ground is 0 degree. The flat ground refers to a surface of the construction target, which has a slight gradient and is not the crest. The berm refers to a flat step provided in the middle of the slope. For example, the flat ground upper threshold is lower than the slope lower threshold, and is higher than the crest upper threshold.

In addition, the grouping unit 213 classifies a combination of consecutive triangles each having a gradient of a triangle that is equal to or higher than the flat ground upper threshold and falls short of the slope lower threshold as the same group and classifies each of combinations of consecutive triangles into groups. Hereinafter, these groups will be referred to as the other groups. The other group is not necessarily required in setting a terrain type for each triangle in design data. However, in a case where the accuracy of terrain type automatic determination is not high, a triangle, which has a gradient of which a terrain type is difficult to be determined, for example, a gradient of a triangle which is equal to or higher than the flat ground upper threshold and falls short of the slope lower threshold, is set as the other group, and later on, an operator can manually set any one of the groups for each triangle in the other group.

The attribute setting unit 214 sets an attribute related to a terrain type for a triangle that belongs to each group classified by the grouping unit 213. The attribute of a plurality of triangles which belong to the same group is the same. Specifically, the attribute setting unit 214 sets a terrain type of a triangle as follows.

The attribute setting unit 214 sets a terrain type of a triangle that belongs to the crest group to the crest. The attribute setting unit 214 sets a terrain type of a triangle that belongs to the slope group to the slope. The attribute setting unit 214 sets a terrain type of a triangle to the berm, the terrain type of the triangle belonging to the flat ground group that is sandwiched between the slope groups and being the flat (that is, elongated) ground group that has a ratio of a length of a long side of a contour shape to a total perimeter of the contour shape of topology (geometric shape) is equal to or higher than a predetermined threshold. A side of the contour shape is not necessarily limited to a linear shape. The attribute setting unit 214 sets a terrain type of a triangle that belongs to the flat ground group having a ratio of a length of a long side to a total perimeter falls short of the predetermined threshold to the flat ground. The attribute setting unit 214 sets a terrain type of a triangle that belongs to the other group to the other.

The height difference calculation unit 215 calculates a height difference between a ground surface indicated by design data and a ground surface indicated by survey data, for example, for each point, at which data exists, on a two-dimensional grid in survey data. Specifically, the height difference calculation unit 215 can calculate a height difference for an arbitrary point in the following procedures.

The height difference calculation unit 215 acquires a height of an intersection point between a line extending in a vertically upward direction from each point on the grid corresponding to the two-dimensional grid of survey data and a triangle configuring design data. This is a height in design data. In addition, a height at each point on the grid in the survey data is a height in survey data. Then, the height difference calculation unit 215 acquires a difference between the height of the design data and the height of the survey data as a height difference.

The allowable error storage unit 231 stores, in association with a terrain type, an error (allowable range) between a terrain according to design data and an actual terrain, which is allowed for the terrain type.

The error determination unit 216 determines whether or not a height difference calculated by the height difference calculation unit 215 falls short of an allowable error according to a terrain type for each point on the two-dimensional grid.

Specifically, the error determination unit 216 identifies, for each point on the two-dimensional grid, a terrain type of a triangle positioned on the point in design data. The error determination unit 216 reads an allowable error associated with the identified terrain type. The error determination unit 216 determines whether or not the height difference calculated by the height difference calculation unit 215 falls short of the read allowable error.

The image generation unit 217 generates an image on which each point on the two-dimensional grid is color-coded based on a determination result from the error determination unit 216 as comparison result data. For example, the image generation unit 217 generates an image on which a point having a height difference falling short of the allowable error is colored green and a point having a height difference that is equal to or higher than the allowable error is colored red.

The result transmission unit 218 transmits the comparison result data generated by the image generation unit 217 to the client terminal 10.

(Operation of Terrain Check System 1)

When construction in the construction site is completed, a user flies a drone over the construction site, thereby executing an aerial photo survey of the construction site. The drone captures an image of the construction site from the sky and generates point group data indicating a shape of the construction site. When the aerial photo survey by the drone is finished, the user inputs design data used in the construction and the point group data generated by the drone into the client terminal 10.

The design data input unit 111 receives an input of TIN data, which is design data. At this time, the design data input unit 111 may check presence or absence of an error (missing, overlapping, inclusion, and interference of a triangle) in the input TIN data. Missing of a triangle refers to a state where an area, in which TIN data surrounded by sides of a plurality of triangles does not exist, exists. Overlapping of a triangle refers to a state where a plurality of pieces of TIN data with three vertices having the same coordinates exist. Inclusion of a triangle refers to a state where a part of a certain triangle is included in another triangle. Interference of triangle refers to a state where a part of a certain triangle crosses a part of another triangle. Any one of overlapping, inclusion, and interference is not limited to a case where a plurality of triangles exist at the same height. That is, it is an error also in a case where a projected triangle is in a relationship of overlapping, inclusion, and interference when TIN data is projected on a horizontal plane. In a case where an error is found, the data conversion unit 113 corrects the error if the error can be corrected. In a case where the error cannot be corrected, the data conversion unit makes notification of the existence of the error. In the other embodiment, the design data input unit 111 may not check an error in input TIN data.

Figure 4:
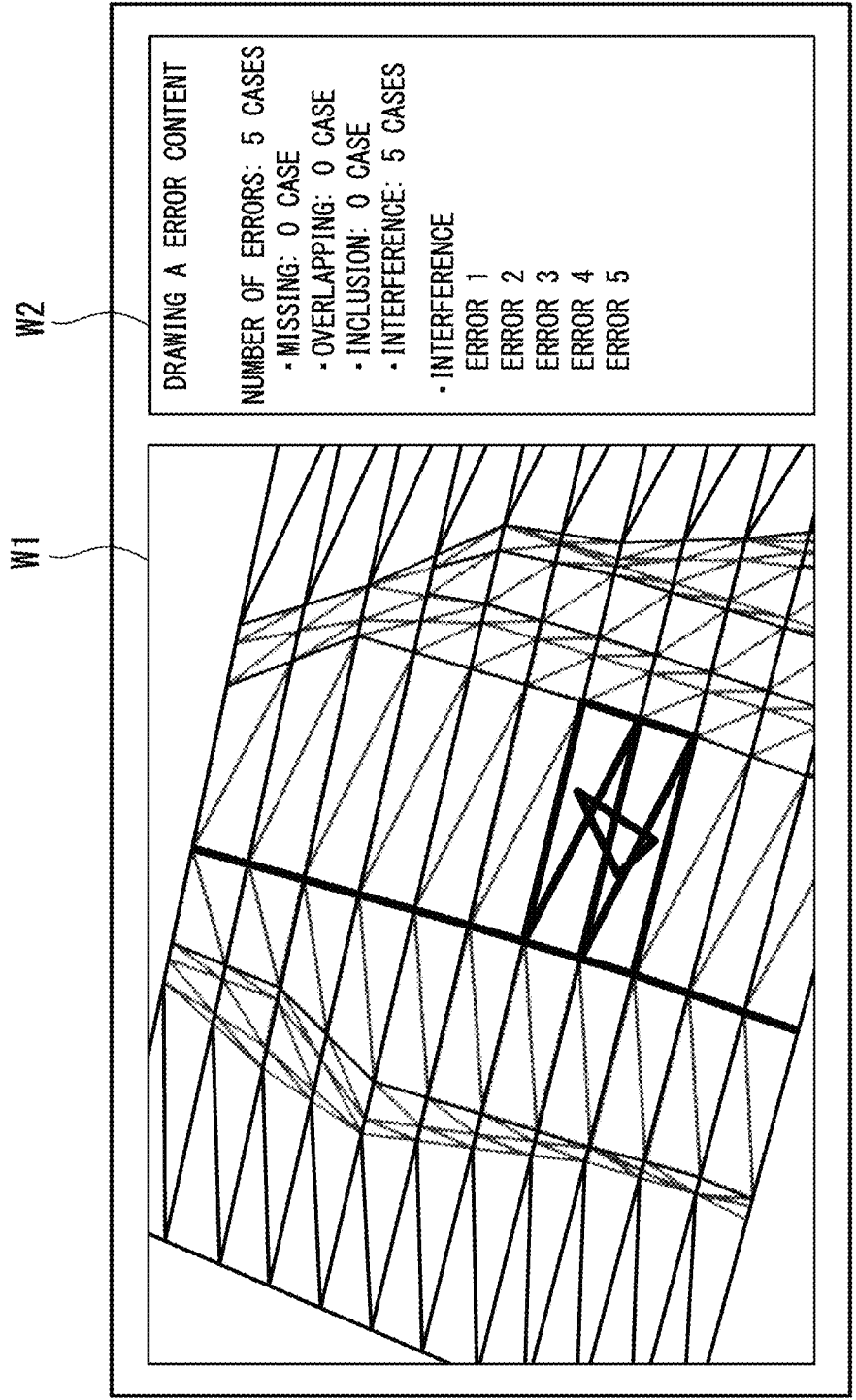
FIG. 4 is a view illustrating an example of a survey data error notification screen.

FIG. 4 is a view illustrating an example of a design data error notification screen.

The design data input unit 111 generates the error notification screen illustrated in FIG. 4 in a case where an error cannot be corrected. A TIN window W1 that displays TIN data and an error window W2 that displays content of an error are provided in the error notification screen. A portion of TIN data where an error has occurred is enlarged and displayed on the TIN window W1. At this time, a triangle in which an error has occurred is highlighted and displayed. Examples of highlighted display include increasing a line width of a side, making a color of a line different from other lines, making a color of a surface different, and the like. Content of an error and the number of errors are displayed on the error window W2. In an example illustrated in FIG. 4, an error of five triangles being in a relationship of interference has occurred. For this reason, the five triangles in the relationship of interference are highlighted and displayed on the TIN window W1, and the fact that five cases of errors related to "interference" exist is displayed on the error window W2.

In a case where an error is not found, or in a case where an error is rectified, the data transmission unit 114 transmits design data and survey data to the terrain check server 20.

Figure 5:
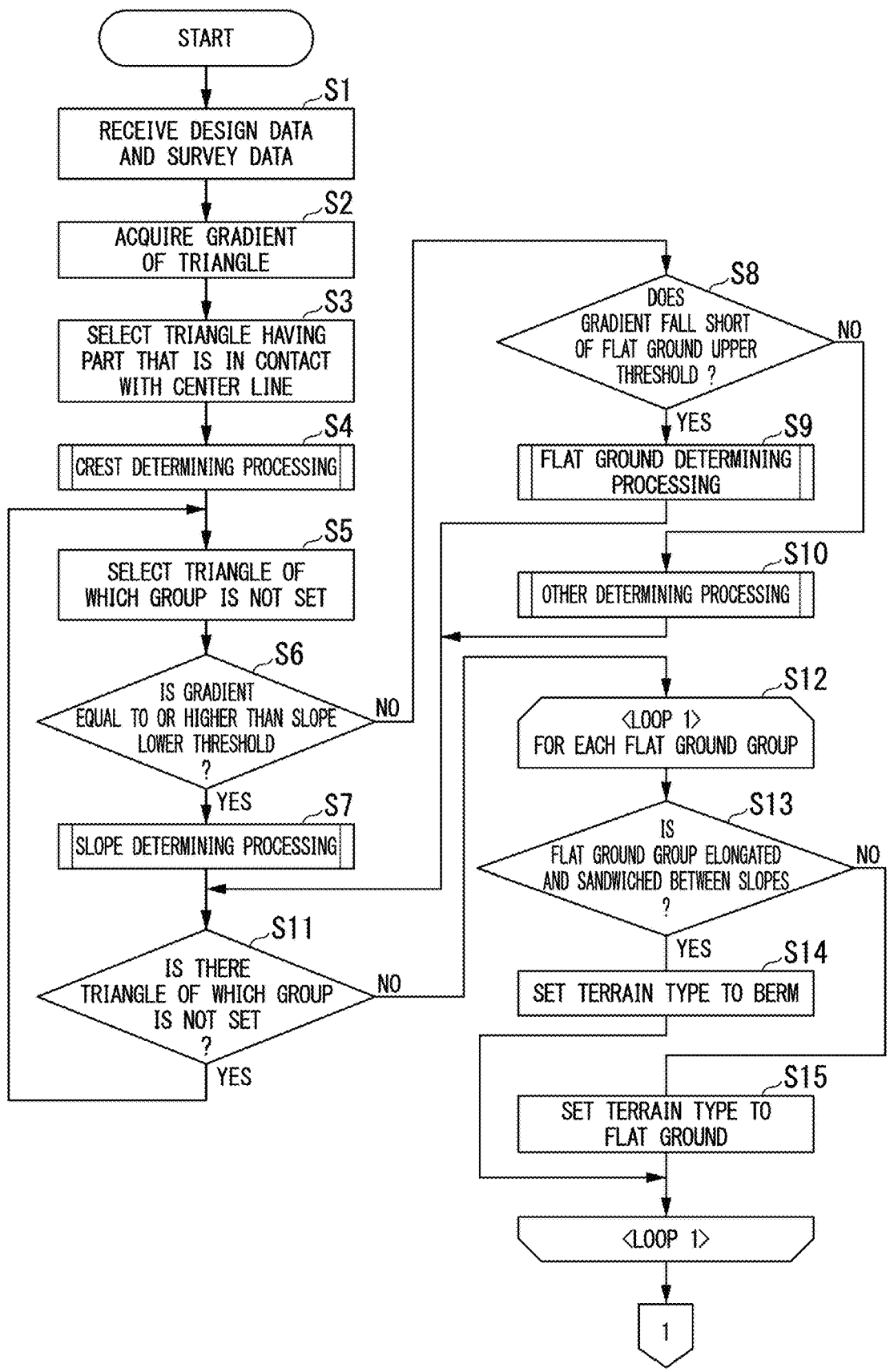
FIG. 5 is a first flow chart showing operation of the terrain check server according to the first embodiment.

FIG. 5 is a first flow chart showing operation of the terrain check server according to the first embodiment. The flow chart shown in FIG. 5 shows operation of the terrain check server 20 setting an attribute for each of triangles configuring design data.

When the client terminal 10 transmits design data and survey data, the data receiving unit 211 of the terrain check server 20 receives the design data and the survey data (Step S1). Next, the gradient identification unit 212 acquires each gradient of a plurality of triangles configuring the received design data (Step S2).

Next, the grouping unit 213 selects one triangle having a part that is in contact with a center line included in the design data (Step S3). Then, the grouping unit 213 executes crest determining processing as follows (Step S4).

Figure 6:
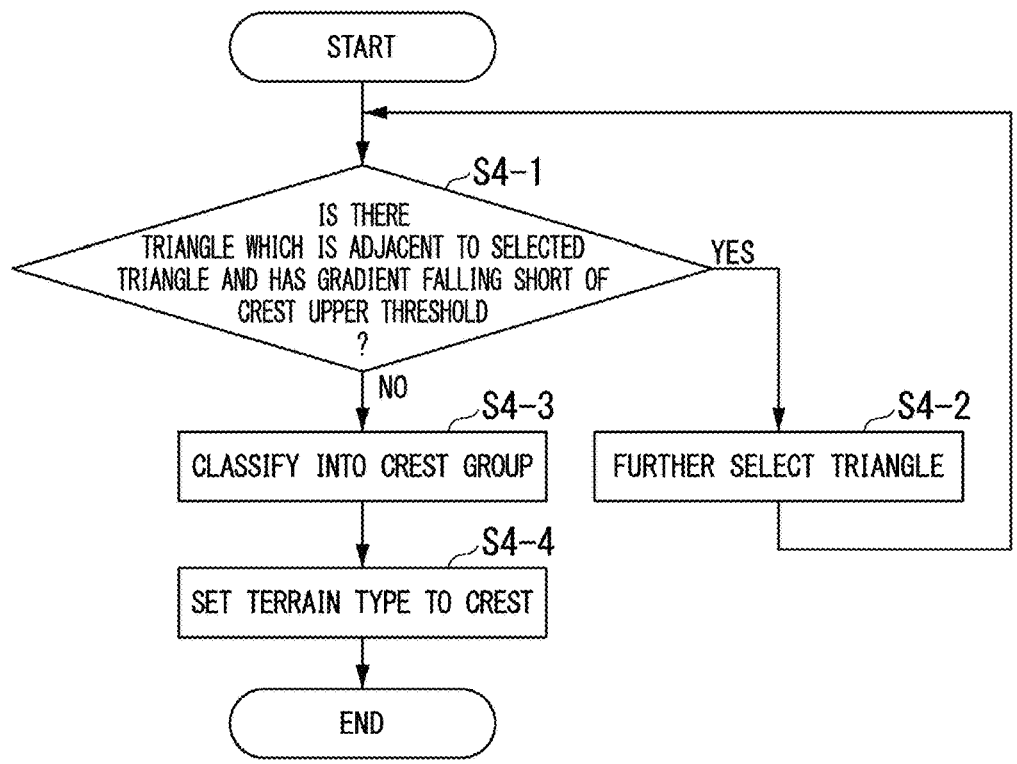
FIG. 6 is a flow chart showing operation of crest determining processing according to the first embodiment.

FIG. 6 is a flow chart showing operation of the crest determining processing according to the first embodiment.

The grouping unit 213 determines whether or not there is a triangle which has a side shared with the selected triangle and has a gradient falling short of the crest upper threshold (Step S4-1). In a case where there is a triangle which has a side shared with the selected triangle and has a gradient falling short of the crest upper threshold (Step S4-1: YES), the grouping unit 213 further selects this triangle (Step S4-2). Then, the grouping unit 213 takes processing back to Step S4-1 and then selects a triangle which has a side shared with any one of the already selected triangles and has a gradient falling short of the crest upper threshold. On the other hand, in a case where there is no triangle which has a side shared with the selected triangles and has a gradient falling short of the crest upper threshold (Step S4-1: NO), the grouping unit 213 classifies a combination of the already selected triangles into the crest group (Step S4-3). Then, the attribute setting unit 214 sets a terrain type of each of the triangles that belong to the crest group to the crest (Step S4-4), and terminates the crest determining processing.

When the crest determining processing is terminated, the grouping unit 213 selects a triangle which is included in the design data and of which a group has not been set yet (Step S5). The grouping unit 213 determines whether or not a gradient of the selected triangle is equal to or higher than the slope lower threshold (Step S6).

In a case where the gradient of the selected triangle is equal to or higher than the slope lower threshold (Step S6: YES), the grouping unit 213 executes slope determining processing as follows (Step S7).

Figure 7:
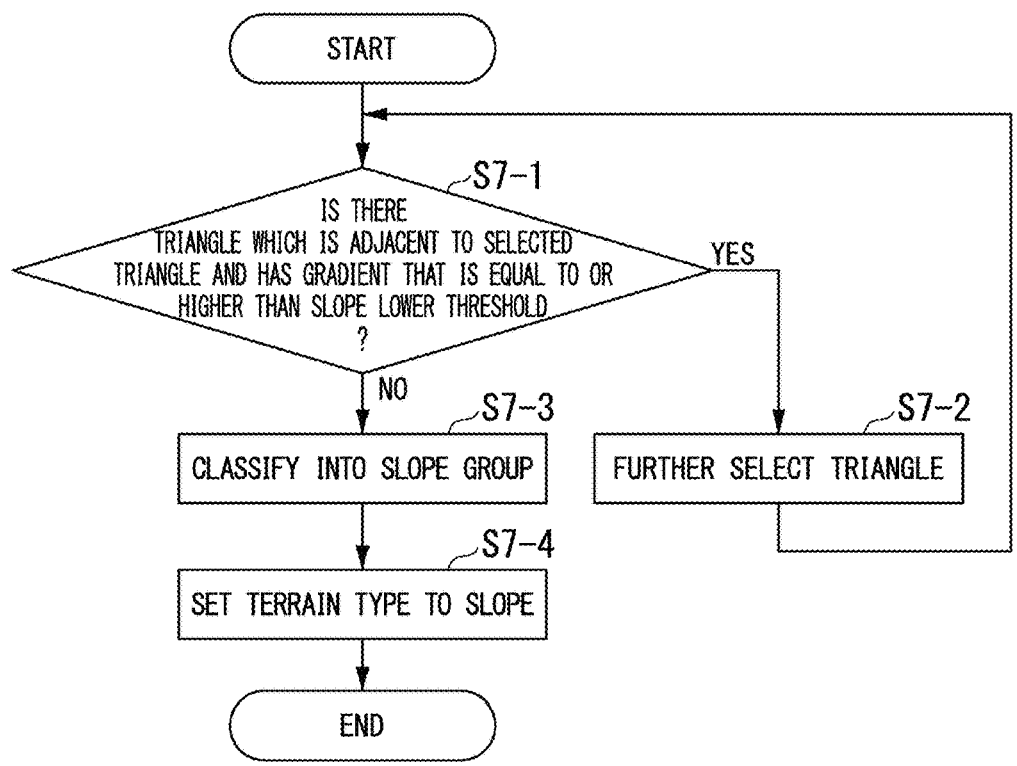
FIG. 7 is a flow chart showing operation of slope determining processing according to the first embodiment.

FIG. 7 is a flow chart showing operation of the slope determining processing according to the first embodiment.

The grouping unit 213 determines whether or not there is a triangle which has a side shared with the selected triangle and has a gradient that is equal to or higher than the slope lower threshold (Step S7-1). In a case where there is a triangle which has a side shared with the selected triangle and has a gradient that is equal to or higher than the slope lower threshold (Step S7-1: YES), the grouping unit 213 further selects this triangle (Step S7-2). Then, the grouping unit 213 takes processing back to Step S7-1 and then selects a triangle which has a side shared with any one of the already selected triangles and has a gradient that is equal to or higher than the slope lower threshold. On the other hand, in a case where there is no triangle which has a side shared with the selected triangles and has a gradient that is equal to or higher than the slope lower threshold (Step S7-1: NO), the grouping unit 213 classifies a combination of the already selected triangles into the slope group (Step S7-3). The attribute setting unit 214 sets a terrain type of each of the triangles that belong to the slope group to the slope (Step S7-4), and terminates the slope determining processing.

In a case where a gradient of the triangle selected in Step S5 falls short of the slope lower threshold (Step S6: NO), the grouping unit 213 determines whether or not the gradient falls short of the flat ground upper threshold (Step S8).

In a case where the gradient of the selected triangle falls short of the flat ground upper threshold (Step S8: YES), the grouping unit 213 executes flat ground determining processing as follows (Step S9).

Figure 8:
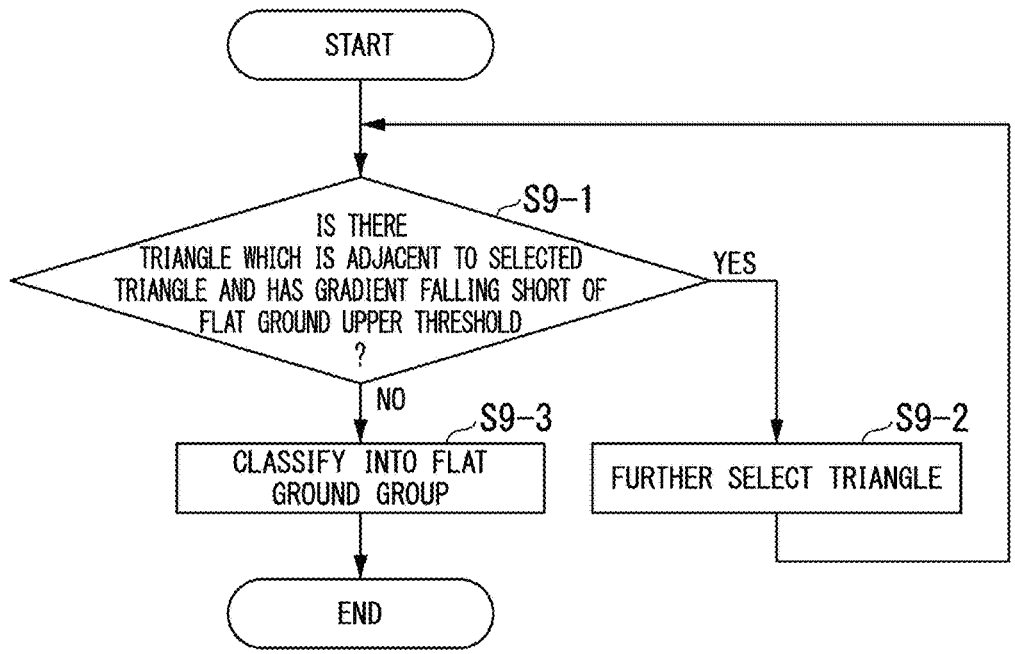
FIG. 8 is a flow chart showing operation of flat ground determining processing according to the first embodiment.

FIG. 8 is a flow chart showing operation of the flat ground determining processing according to the first embodiment.

The grouping unit 213 determines whether or not there is a triangle which has a side shared with the selected triangle and has a gradient falling short of the flat ground upper threshold (Step S9-1). In a case where there is a triangle which has a side shared with the selected triangle and has a gradient falling short of the flat ground upper threshold (Step S9-1: YES), the grouping unit 213 further selects this triangle (Step S9-2). Then, the grouping unit 213 takes processing back to Step S9-1 and then selects a triangle which has a side shared with any one of the already selected triangles and has a gradient falling short of the flat ground upper threshold. On the other hand, in a case where there is no triangle which has a side shared with the selected triangles and has a gradient falling short of the flat ground upper threshold (Step S9-1: NO), the grouping unit 213 classifies a combination of the already selected triangles into the flat ground group (Step S9-3), and terminates the flat ground determining processing. Herein, the attribute setting unit 214 does not set a terrain type of each of the triangles that belong to the flat ground group.

In a case where the gradient of the triangle selected in Step S5 falls short of the slope lower threshold and is equal to or higher than the flat ground upper threshold (Step S8: NO), the grouping unit 213 executes the other determining processing as follows (Step S10).

Figure 9:
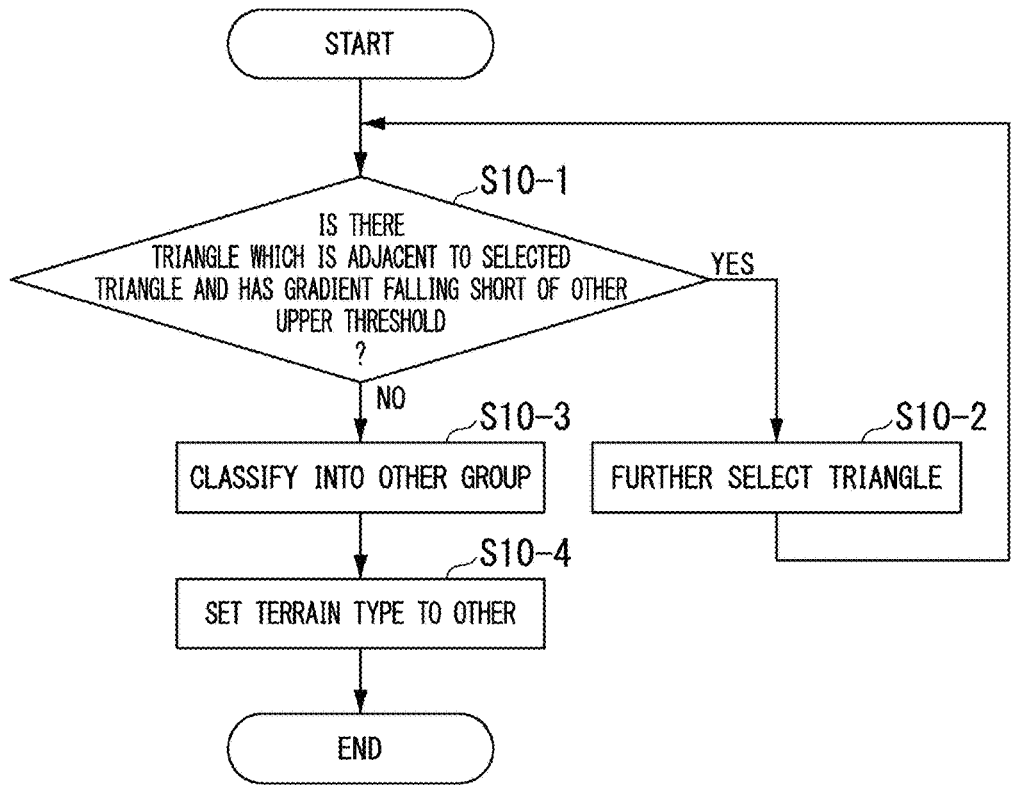
FIG. 9 is a flow chart showing operation of the other determining processing according to the first embodiment.

FIG. 9 is a flow chart showing operation of the other determining processing according to the first embodiment. The grouping unit 213 determines whether or not there is a triangle which has a side shared with the selected triangle and has a gradient that falls short of the slope lower threshold and is equal to or higher than the flat ground upper threshold (Step S10-1). In a case where there is a triangle which has a side shared with the selected triangle and has a gradient that falls short of the slope lower threshold and is equal to or higher than the flat ground upper threshold (Step S10-1: YES), the grouping unit 213 further selects this triangle (Step S10-2). Then, the grouping unit 213 takes processing back to Step S10-1 and then selects a triangle which has a side shared with any one of the already selected triangles and has a gradient that falls short of the slope lower threshold and is equal to or higher than the flat ground upper threshold. On the other hand, in a case where there is no triangle which has a side shared with the selected triangles and has a gradient that falls short of the slope lower threshold and is equal to or higher than the flat ground upper threshold (Step S10-1: NO), the grouping unit 213 classifies a combination of the already selected triangles into the other group (Step S10-3). The attribute setting unit 214 sets a terrain type of each of the triangles that belong to the other group to the other (Step S10-4), and terminates the other determining processing.

Then, when a combination of triangles is classified into a group, the grouping unit 213 determines whether or not there is a triangle of which a group is yet to be set, out of the triangles included in the design data (Step S11). In a case where there is a triangle of which a group is not set (Step S11: YES), the grouping unit 213 takes processing back to Step S5, and classifies the triangle of which a group is not set into a group based on the above rules.

In a case where all of the triangles are classified into groups (Step S11: NO), the attribute setting unit 214 executes processing of the following Step S13 to Step S15 for each flat ground group out of the plurality of groups (Step S12).

The attribute setting unit 214 determines whether or not a certain flat ground group has a ratio of a length of a long side to a total perimeter of a contour shape of topology is equal to or higher than a predetermined threshold, and is sandwiched between two slope groups (Step S13). A width of the contour shape of topology is not necessarily limited to being constant. In this case, the attribute setting unit 214 calculates the ratio based on, for example, a representative value of the width (for example, an average value, a maximum value, and the like).

In a case where the contour shape of the flat ground group is elongated and is sandwiched between the slope groups (Step S13: YES), the attribute setting unit 214 sets a terrain type of each of the triangles that belong to the flat ground group to the berm (Step S14).

On the other hand, in a case where the contour shape of the flat ground group is not elongated or is not sandwiched between the slope groups (Step S13: NO), the attribute setting unit 214 sets a terrain type of each of the triangles that belong to the flat ground group to the flat ground (Step S15).

Figure 10:
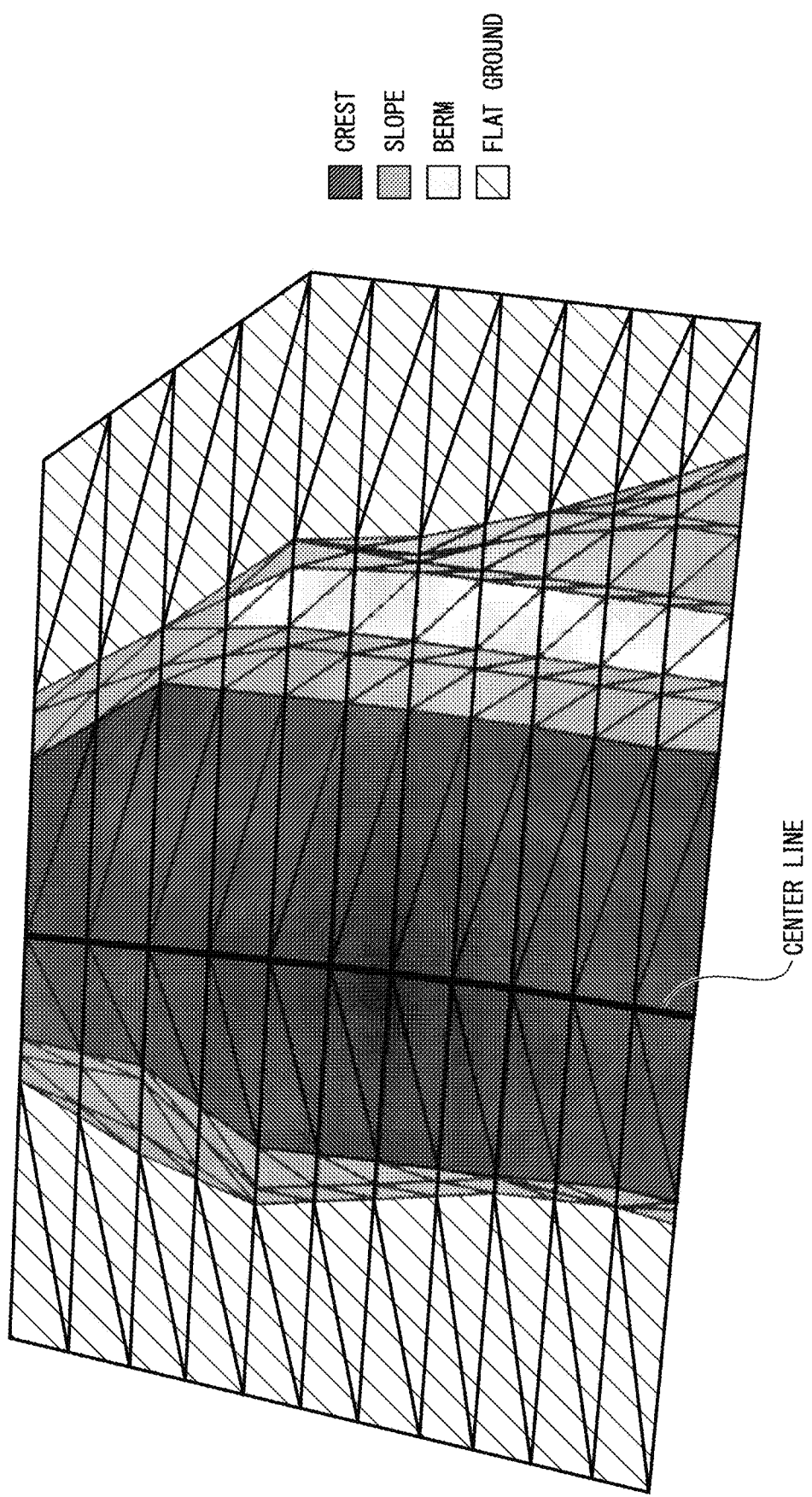
FIG. 10 is a view illustrating an example of a setting result of a terrain type by the terrain check server.

FIG. 10 is a view illustrating an example of a setting result of the terrain type by the terrain check server.

The terrain check server 20 can set a terrain type for each of triangles configuring design data by executing processing of Step S1 to Step S15 described above. It can be seen that the crest, the slope, the flat ground, and the berm are appropriately set as a terrain type of each of the triangles configuring design data with reference to FIG. 9.

Figure 11:
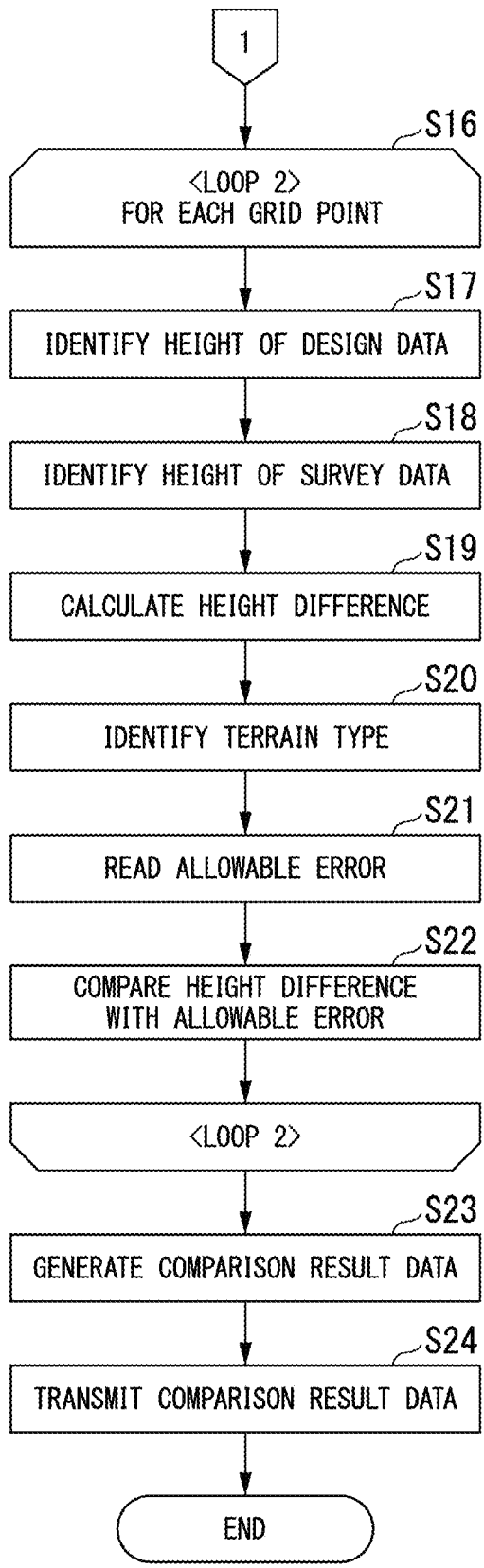
FIG. 11 is a second flow chart showing operation of the terrain check server according to the first embodiment.

FIG. 11 is a second flow chart showing operation of the terrain check server according to the first embodiment. The flow chart shown in FIG. 11 shows operation of the terrain check server 20 comparing design data with survey data.

When the attribute setting unit 214 sets terrain types of all of triangles that belong to the flat ground group, the terrain check server 20 executes processing of the following Step S17 to Step S22 for each point on the two-dimensional grid having a horizontal plane as reference (Step S16).

First, the height difference calculation unit 215 acquires a height of an intersection point between a line extending from a point on a certain grid and a triangle configuring design data (Step S17). In addition, the height difference calculation unit 215 acquires a height of an intersection point between a line extending in the vertically upward direction from the point and a triangle configuring survey data (Step S18). Then, the height difference calculation unit 215 acquires a difference between the height of the design data and the height of the survey data as a height difference (Step S19).

Next, the error determination unit 216 identifies a terrain type of a triangle related to the node acquired in Step S17 (Step S20). The error determination unit 216 reads an allowable error associated with the identified terrain type from the allowable error storage unit 231 (Step S21). The error determination unit 216 compares the height difference calculated in Step S19 with the read allowable error (Step S22).

When the height difference is compared with the allowable error for all points of the two-dimensional grid shape, the image generation unit 217 generates comparison result data, which is an image on which each point on the two-dimensional grid is color-coded based on the comparison result of Step S22 (Step S23). That is, the image generation unit 217 generates an image on which a point having a height difference falling short of the allowable error and a point having a height difference that is equal to or higher than the allowable error are colored different colors. Then, the result transmission unit 218 transmits the comparison result data generated by the image generation unit 217 to the client terminal 10 (Step S24).

Accordingly, the result receiving unit 115 of the client terminal 10 acquires the comparison result data from the terrain check server 20, and the output unit 116 can output the comparison result data to the output device 13.

Figure 12:
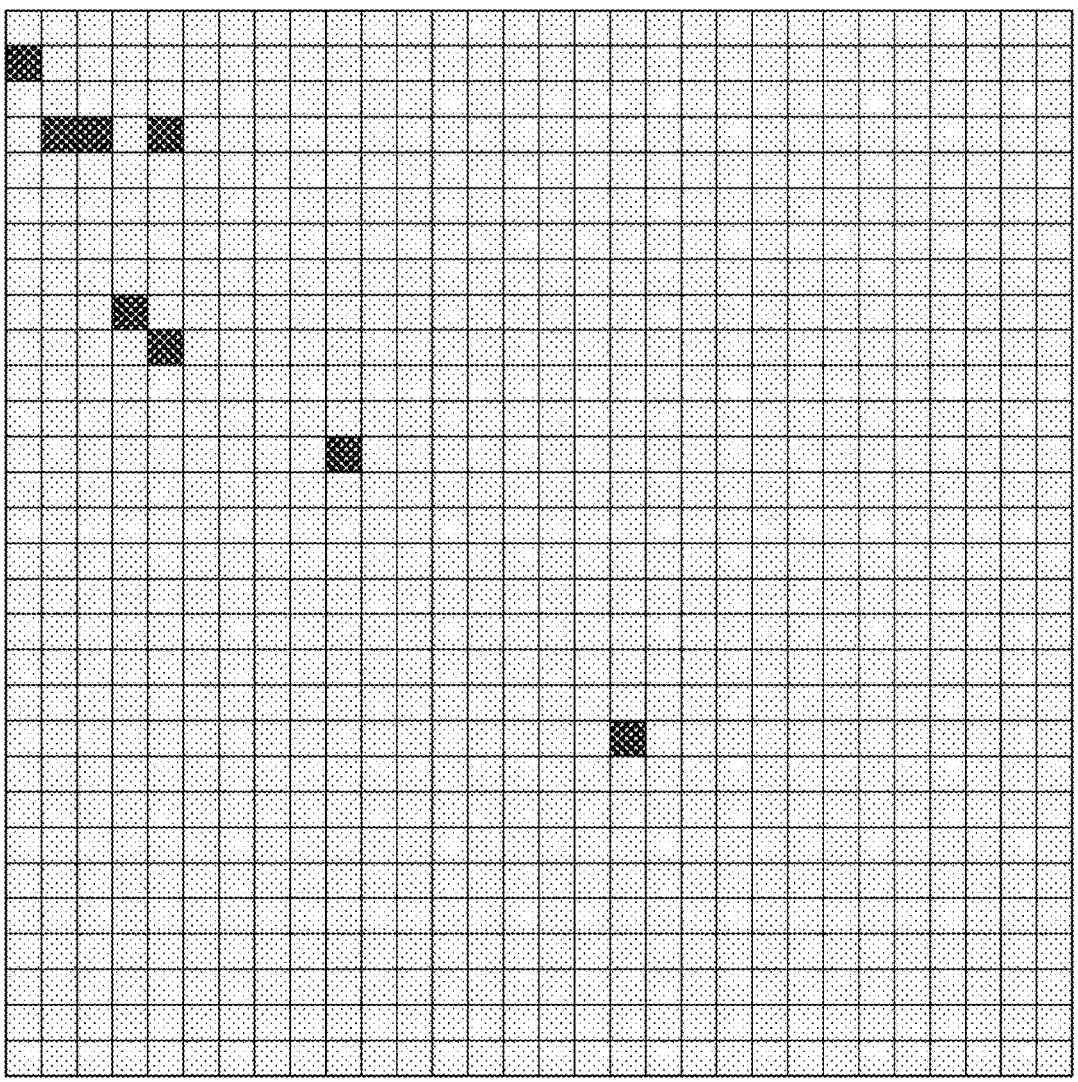
FIG. 12 is a view illustrating a display example of comparison result data.

FIG. 12 is a view illustrating a display example of comparison result data.

As illustrated in FIG. 12, the comparison result data is a drawing of the construction site in a plan view, and has a plurality of sections obtained by dividing the construction site by each point on the two-dimensional grid. In the comparison result data, a color of each section is different according to whether or not a height difference is equal to or higher than the allowable error. Accordingly, a user can easily determine whether or not construction is carried out as design data. In addition, the user can easily recognize a spot where a height difference does not satisfy requirements. At this time, the output unit 116 may cause the output device 13 to display coordinate information when any section is selected by the input device 12.

As described above, in the first embodiment, the terrain check server 20 receives an input of design data, and sets an attribute for each triangle based on a gradient of each of a plurality of triangles configuring the design data. Accordingly, the terrain check server 20 can appropriately set an attribute for each of the triangles configuring the design data.

In the first embodiment, the terrain check server 20 classifies a combination of triangles having a common side into a group based on a gradient, and sets the same attribute for the plurality of triangles that belong to the same group. Accordingly, the terrain check server 20 can collectively set an attribute for each of the plurality of triangles. Although the terrain check server 20 identifies which terrain type is set for each group in the first embodiment, the invention is not limited thereto. For example, in the other embodiment, after the grouping unit 213 of the terrain check server 20 classifying into a plurality of groups formed of a combination of triangles, an input of a terrain type of each group may be received from a user. In this case, the attribute setting unit 214 sets an input terrain type as an attribute of each of the plurality of triangles that belong to that group.

In the first embodiment, the terrain check server 20 calculates a height difference between design data and survey data for each of a plurality of plane positions, and determines whether or not the height difference is equal to or higher than an allowable error associated with a terrain type. Accordingly, a user can easily determine whether or not construction is carried out as design. In addition, in the first embodiment, the terrain check server 20 generates determination result data in which a determination result is color-coded for each of the plurality of plane positions. Accordingly, the user can easily recognize a spot where a height difference does not satisfy requirements.

The other embodiment is not limited thereto. The terrain check server 20 may only assign an attribute, and may not determine a height difference.

Other Embodiment

Although one embodiment is described in detail with reference to the drawings hereinbefore, a specific configuration is not limited to the description above, and it is possible to make various design modifications or the like.

For example, although the terrain check server 20 sets a terrain type as an attribute of a triangle in the aforementioned embodiment, the invention is not limited thereto. The terrain check server 20 according to the other embodiment may set information related to a terrain (for example, a soil quality, water content, and the like) as an attribute of a triangle.

Although the terrain check server 20 sets an attribute indicating that a terrain type is the crest for a triangle having a part which is in contact with a center line and triangles for which the same group is set with the use of geometrical information in the aforementioned embodiment, the invention is not limited thereto. For example, the terrain check server 20 according to the other embodiment may set a terrain type of a triangle that belongs to a group at the highest position, out of a plurality of flat ground groups, to the crest in a case where a center line is not included in design data.

Although the terrain check server 20 sets an attribute indicating that a terrain type is the berm for a triangle that is sandwiched between other polygons, of which a terrain type is the slope, and belongs to a group having a ratio of a length of a long side of a contour shape to a total perimeter of the contour shape is equal to or higher than a threshold in the aforementioned embodiment, the invention is not limited thereto. For example, the terrain check server 20 according to the other embodiment may set an attribute indicating that a terrain type is the berm for a triangle that belongs to a group sandwiched between other polygons, of which a terrain type is the slope, regardless of slenderness of the contour shape. In addition, the terrain check server 20 according to the other embodiment may set an attribute indicating that a terrain type is the berm for a triangle that belongs to a group having an elongated contour shape regardless of whether or not the triangle is sandwiched between slopes.

In addition, although the terrain check server 20 has functions of a geographic information processing device in the aforementioned embodiment, the invention is not limited thereto. For example, the client terminal 10 according to the other embodiment may include some of or all of the functions of the terrain check server 20. That is, the geographic information processing device may be configured with a combination of the terrain check server 20 and the client terminal 10, and the client terminal 10 may have functions of the geographic information processing device. In addition, the geographic information processing device may be realized by a combination of the terrain check server 20 or the client terminal 10 and another device. In a case where the geographic information processing device is realized by the client terminal 10, the design data input unit 111 corresponds to the acquisition unit that acquires design data. In addition, the terrain check server 20 according to the other embodiment may be a server that can complete processing as a single body by having functions of the client terminal 10 including the design data input unit 111, the point group data input unit 112, and the data conversion unit 113. That is, the terrain check server 20 according to the other embodiment may include the error detection unit that detects an error of design data.

In addition, although the terrain check system 1 checks the construction of filling up a road in the aforementioned embodiment, the invention is not limited thereto. For example, in the other embodiment, the terrain check system 1 may check various types of construction, including river construction, levee construction, residential land construction, and solar power plant construction.

In addition, although design data is prepared in advance as TIN data in the aforementioned embodiment, the invention is not limited thereto. For example, design data may be formed of three-dimensional data in another form including point group data in the other embodiment. Even in this case, the terrain check server 20 acquires design data by identifying a polygon indicating the ground surface from input design data, and performs determination based on the polygon.

In addition, although the terrain check system 1 determines an error of a height difference based on an allowable error associated with a terrain type of a triangle configuring design data in the aforementioned embodiment, the invention is not limited thereto. For example, in the other embodiment, the terrain check system 1 determines an error of a height difference based on an allowable error set according to a gradient for each triangle configuring design data or an average gradient of a group formed of a plurality of triangles. For example, as for a triangle having a gradient that is equal to or higher than the slope lower threshold, an error of a height difference can be determined with the use of an allowable error related to a slope. As for a triangle having a gradient falling short of the slope lower threshold, an error of a height difference can be determined with the use of an allowable error related to flat ground. In this case, the terrain check system 1 may not necessarily have to set a terrain type.

Although a case where the terrain check client program is stored in the storage 130 of the client terminal 10 according to the aforementioned embodiment is described, the invention is not limited thereto. For example, in the other embodiment, the terrain check client program may be delivered to the client terminal 10 through a communication line. In this case, the client terminal 10 which has received the delivery deploys the terrain check client program to the main memory 120, and executes the processing.

Similarly, although a case where the terrain check server program is stored in the storage 230 of the terrain check server 20 according to the aforementioned embodiment is described, the invention is not limited thereto. For example, in the other embodiment, the terrain check server program may be delivered to the terrain check server 20 through a communication line. In this case, the terrain check server 20 which has received the delivery deploys the terrain check server program to the main memory 220, and executes the processing.

In addition, the terrain check client program and the terrain check server program may be programs for realizing some of the aforementioned functions. For example, the terrain check client program and the terrain check server program may realize the aforementioned functions in combination with another program that is already stored or in combination with another program that is installed in another device.

In addition, the client terminal 10 or the terrain check server 20 may include a programmable logic device (PLD) in addition to the configuration or instead of the configuration. Examples of the PLD include Programmable Array Logic (PAL), Generic Array Logic (GAL), a complex programmable logic device (CPLD), field programmable gate array (FPGA), and the like. In this case, some of functions realized by the processor 110 or the processor 210 may be realized by the PLD.

INDUSTRIAL APPLICABILITY

In the embodiment, the geographic information processing device can appropriately set an attribute for each of polygons configuring design data.

REFERENCE SIGNS LIST

1: terrain check system
10: client terminal
111: design data input unit
112: point group data input unit
113: data conversion unit
114: data transmission unit
115: result receiving unit
116: output unit
20: terrain check server
211: data receiving unit
212: gradient identification unit
213: grouping unit
214: attribute setting unit
215: height difference calculation unit
216: error determination unit
217: image generation unit
218: result transmission unit
231: allowable error storage unit

The invention claimed is:

1. A geographic information processing device comprising:
    an acquisition unit that is configured to acquire design data of a construction site which is three-dimensional data indicating a terrain;
    a gradient identification unit that is configured to identify a gradient of each of a plurality of polygons configuring the design data;
    a grouping unit that is configured to classify a combination of polygons having a common side, out of the plurality of polygons, into a group based on the gradient;
    an attribute setting unit that is configured to set the same attribute for the plurality of polygons that belong to the same group;
    a comparison data acquisition unit that is configured to acquire survey data which is another three-dimensional data indicating a terrain;
    a height difference calculation unit that is configured to calculate a height difference between the design data and the survey data for each of a plurality of plane positions; and
    an error determination unit that is configured to determine whether the height difference at each of the plurality of plane positions falls within or outside of an allowable range of construction error, which is dependent upon an attribute of the polygon of the design data at the plane position.

2. The geographic information processing device according to claim 1,
    wherein the attribute setting unit sets an attribute indicating that a terrain type is a crest for a polygon that is in contact with a reference figure.

3. The geographic information processing device according to claim 1,
    wherein the attribute setting unit sets an attribute indicating that a terrain type is a slope for a polygon that has the gradient which is equal to or higher than a slope lower threshold.

4. The geographic information processing device according to claim 1,
    wherein the allowable error is different for each attribute.

5. The geographic information processing device according to claim 1, further comprising:
    an error detection unit that is configured to detect an error of the design data acquired by the acquisition unit.

6. The geographic information processing device according to claim 2, wherein the attribute setting unit sets an attribute indicating that a terrain type is a slope for a polygon that has the gradient which is equal to or higher than a slope lower threshold.

7. The geographic information processing device according to claim 2, further comprising:
an error detection unit that is configured to detect an error of the design data acquired by the acquisition unit.

8. The geographic information processing device according to claim 3, further comprising:
an error detection unit that is configured to detect an error of the design data acquired by the acquisition unit.

9. The geographic information processing device according to claim 1, further comprising:
an image generation unit configured to generate an image on which each of the plurality of plane positions represented on a two-dimensional grid is color-coded based on a determination result from the error determination unit.

10. A geographic information processing device comprising:
an acquisition unit that is configured to acquire design data of a construction site which is three-dimensional data indicating a terrain and survey data which is another three-dimensional data;
a height difference calculation unit that is configured to calculate a height difference between each of polygons configuring the design data and the survey data for each of a plurality of plane positions;
a gradient identification unit that is configured to identify a gradient of each of the plurality of polygons configuring the design data; and
an error determination unit that is configured to determine whether the height difference at each of the plurality of plane positions fall within or outside of an allowable range of construction error, which is set according to the gradient of the polygon of the design data at the plane position.

11. A geographic information processing method comprising:
acquiring design data of a construction site which is three-dimensional data indicating a terrain;
identifying a gradient of each of a plurality of polygons configuring the design data;
classifying a combination of polygons having a common side, out of the plurality of polygons, into a group based on the gradient;
setting the same attribute for each of the plurality of polygons that belong to the same group;
acquiring survey data which is another three-dimensional data indicating a terrain;
calculating a height difference between the design data and the survey data for each of a plurality of plane positions; and
determining whether the height difference at each of the plurality of plane positions falls within or outside of an allowable range of construction error, which is dependent upon an attribute of the polygon of the design data at the plane position.

12. A non-transitory computer storage medium storing a program, which when executed by a computer, implements a method comprising:
acquiring design data of a construction site which is three-dimensional data indicating a terrain;
identifying a gradient of each of a plurality of polygons configuring the design data;
classifying a combination of polygons having a common side, out of the plurality of polygons, into a group based on the gradient;
setting the same attribute for each of the plurality of polygons that belong to the same group;
acquiring survey data which is another three-dimensional data indicating a terrain;
calculating a height difference between the design data and the survey data for each of a plurality of plane positions; and
determining whether the height difference at each of the plurality of plane positions falls within or outside of an allowable range of construction error, which is dependent upon an attribute of the polygon of the design data at the plane position.

* * * * *